Aug. 5, 1969    A. H. SINCLAIR ET AL    3,459,439
LOW VOLUME SPRING VEHICLE SUSPENSION AND ELEVATION SYSTEM
Filed April 28, 1967    5 Sheets-Sheet 1

ALEX H. SINCLAIR
ROBERT J. OTTO
INVENTORS

H. M. Saragovitz
BY E. J. Kelly, E. H. Berl
ATTORNEYS
and J. B. McGuire
AGENT

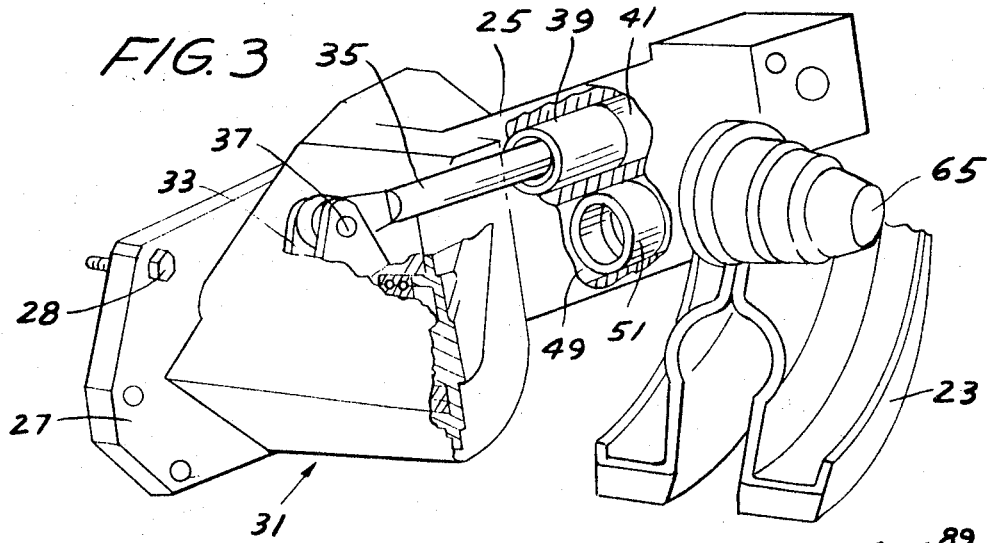
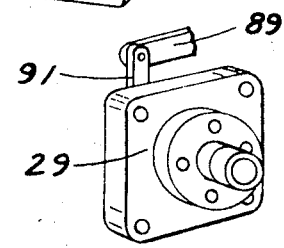
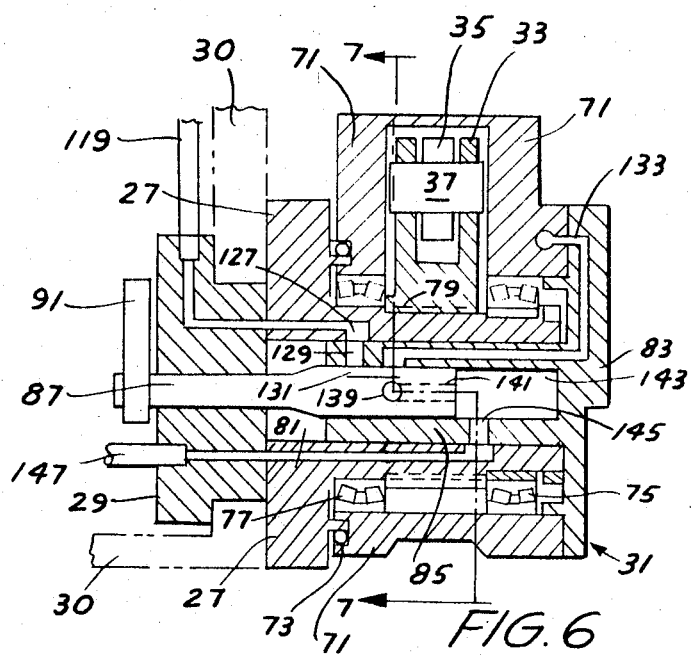
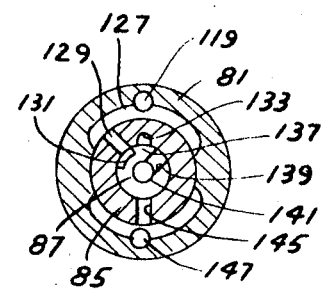

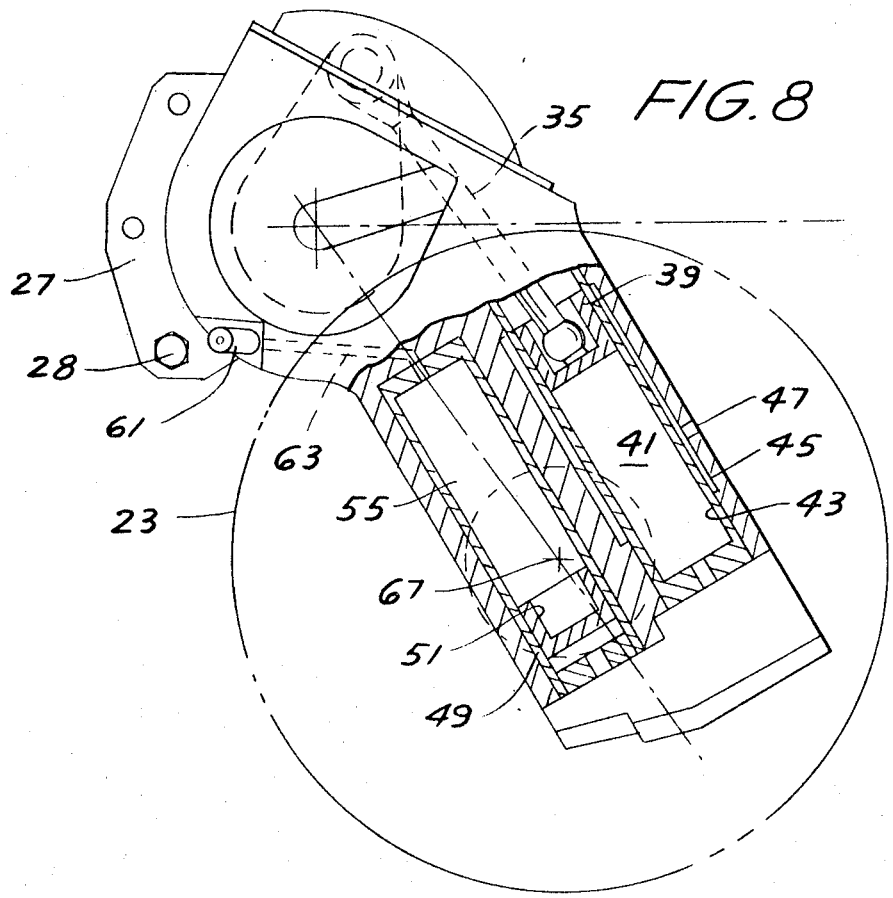
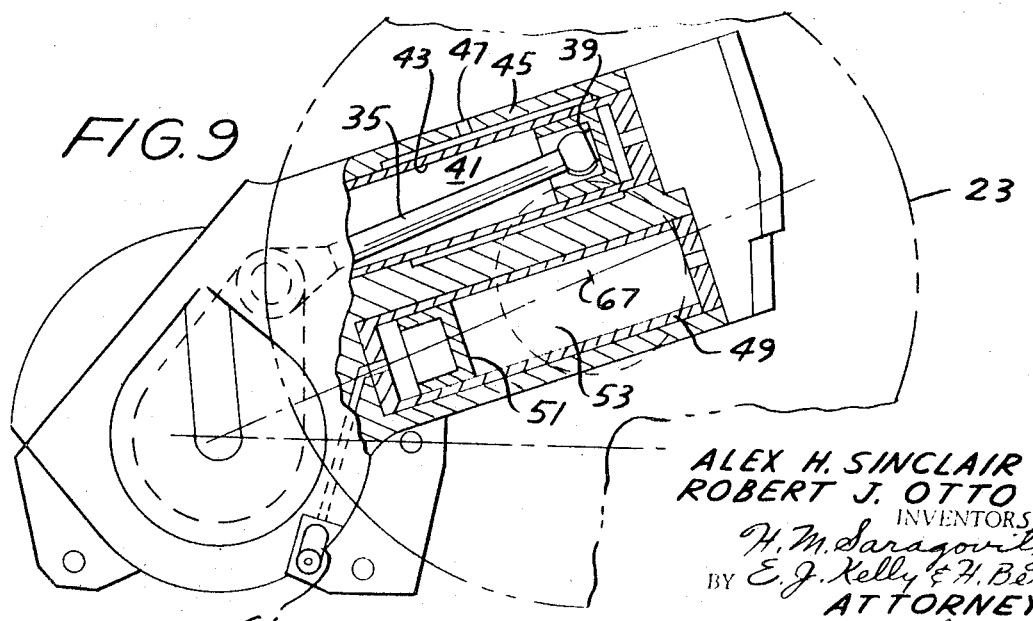

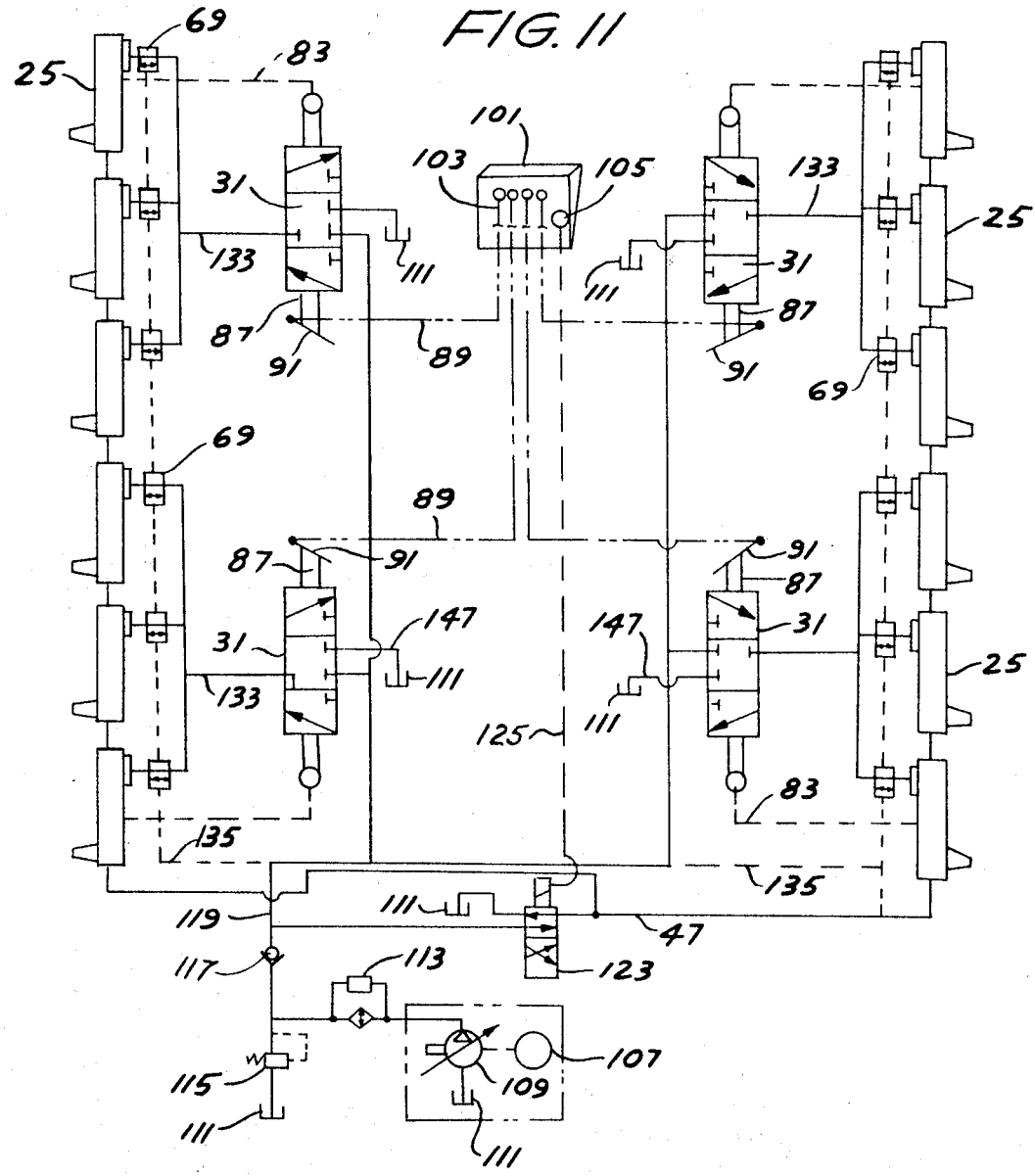

United States Patent Office 3,459,439
Patented Aug. 5, 1969

3,459,439
LOW VOLUME SPRING VEHICLE SUSPENSION
AND ELEVATION SYSTEM
Alex H. Sinclair, Southfield, and Robert J. Otto, Detroit,
Mich., assignors to the United States of America as
represented by the Secretary of the Army
Filed Apr. 28, 1967, Ser. No. 635,962
Int. Cl. B60g 3/12, 11/48; B62d 55/12
U.S. Cl. 280—124                              6 Claims

ABSTRACT OF THE DISCLOSURE

A vehicle suspension and elevation system having a roadarm for each road wheel of the vehicle. Each roadarm is oscillatable within a predetermined angular range from a remote position by means of a rotatable hydraulic valve which can provide passages for fluid to and from an hydraulic cylinder in the roadarm. A piston is mounted in each cylinder and its related piston rod is eccentrically mounted relative to the roadarm axis so that, as the cylinder is filled with fluid, the roadarm rotates.

A gas charged hydraulic accumulator is provided in each roadarm. The accumulator acts as a spring and damper by compressing a gas as the accumulator accepts hydraulic fluid from the cylinder when the roadarm is oscillated due to its associated wheel hitting an obstacle or bump.

---

This invention pertains to a vehicle suspension and elevation system. Although it may be used on any wheeled or tracked vehicle upon which it is desired to elevate or depress one or more road wheels, it is especially useful on a vehicle upon which it is desired to elevate or depress the silhouette of the vehicle body relative to the surface of the earth. The vehicle body ground clearance in a vehicle utilizing the instant invention is varied by means of hydraulic cylinder in the roadarms, each of which carries a road wheel. As the hydraulic cylinder is filled with fluid under pressure, the specific mounting of the piston which is slidably mounted in the cylinder causes the roadarm to rotate about its axis of rotation.

Also in the instant invention, when a road wheel is forced upward upon impact with obstacles, the upward movement is resisted by the hydro-pneumatic spring contained in the roadarm. This hydro-pneumatic spring provides greater wheel travel than obtainable by conventional suspension systems. The spring is formed by the elevation control hydraulic cylinder and an accumulator mounted in a series relationship hydraulically so that as the roadarm is forced upward, the fluid forced out of the cylinder causes the compression of a gas in the accumulator. After the obstacle is traversed, the compressed gas forces the fluid back into the cylinder, thereby forcing the roadarm back to its normal position.

It is an object of the present invention to provide a new and useful vehicle elevation and suspension system wherein the system is entirely contained within the individual vehicle roadarms.

It is also an object of the invention to provide a vehicle suspension means which will enable a vehicle to negotiate obstacles at speeds unobtainable by conventional limited wheel travel suspension systems without transmitting extreme shock or road vibration forces to the vehicle and personnel therein.

It is also an object of the invention to provide a vehicle suspension means which, upon impact of the vehicle wheel with a road obstacle, the road wheel is forced upward and is resisted in its upward travel by an hydro-pneumatic spring which allows greater wheel travel than obtainable in conventional suspension systems.

It is a further object of the present invention to provide a means for controlling vehicle ground clearance by adding or subtracting fluid from the vehicle suspension systems.

It is also an object of the present invention to provide a vehicle suspension and body elevation means which gives increased mobility and performance with a drastic reduction in the use of the vehicle's internal hull space.

It is a still further object of the instant invention to provide a vehicle suspension elevation means which is externally mounted, thereby permitting rapid field and maintenance replacement.

It is also an object of the instant invention to incorporate all of the vehicle suspension functions of variable spring damping media, jounce stop, positive lockout, and automatic vehicle height control into an externally mounted modular system.

It is a further object of the present invention to provide a vehicle body elevation control means which may be operated from within the vehicle by a remote control system which adds an hydraulic fluid under pressure to a cylinder within the individual roadarms of the vehicle wheels.

It is also an object of the instant invention to provide a vehicle elevation control means within the individual roadarms of the vehicle wherein a valve situated at the axis of rotation or oscillation of the vehicle roadarm may be manipulated by the vehicle operator from a remote position and which is manipulated again by a feed back system in the vehicle roadarm when the roadarm reaches the desired angular position relative to its center of rotation.

It is also an object of the present invention to provide a vehicle suspension means in which, upon operation of a remote control by the vehicle operator, the suspension can be locked in a predetermined position so as to maintain the vehicle road wheels in that position and so that they may not be moved upon contact with a road obstacle or by any other means.

It is a still further object of the instant invention to provide a vehicle suspension unit wherein each roadarm retains its individual position upon failure of pressure in the hydraulic system.

It is also an object of this invention to provide a vehicle suspension system wherein the suspension system is fitted with damping devices which reduce hull oscillations and provide optimum vehicle mobility.

It is also an object of the invention to provide a vehicle elevation and suspension system in which the vehicle elevation is controlled by the amount of hydraulic fluid in a cylinder of a roadarm of the vehicle and in which, when the roadarm is forced upward by an obstacle contacting its wheel, the fluid is forced out of the cylinder, causing the compression of a gas in an accumulator in the roadarm, thereby providing a force to return the roadarm to its initial position when the wheel has passed the obstacle.

Other objects of invention will become obvious to those skilled in the art upon review of the following description of a preferred embodiment of the invention. The novel features which are considered as characteristic of the invention are set forth in particular in the appended claims. The improved apparatus itself, however, both as to its construction and its mode of operation, together with additional features and advantages thereof, will be best understood upon persual of the following detailed description of a specific embodiment of the invention, with reference to the accompanying drawings. It is also to be understood that the phraseology and terminology employed herein is for the purpose of description and not limitation.

In the drawings:

FIGURE 3 shows a perspective view of a preferred embodiment of the invention partly in section and partly in phantom.

FIGURE 4 shows a portion of the hydraulic valve control means which is situated inside of the vehicle body or hull.

FIGURE 6 shows a sectional view of the hydraulic valve of the vehicle roadarm taken along a line 6—6 of FIGURE 2.

FIGURE 7 shows a sectioned view of the internal primary portion of the hydraulic control valve of the vehicle roadarm taken along a line 7—7 of FIGURE 6, with the valve spool rotated to a position other than that shown in FIGURE 6.

FIGURE 8 is a side view of the preferred embodiment of the instant invention with the vehicle roadarm partly in section and carrying the road wheel in phantom, so as to maintain the vehicle body at its greatest elevation relative to the earth.

FIGURE 9 shows a view similar to FIGURE 8 with the roadarm oscillated to its uppermost position such as that attained when the vehicle roadwheel contacts an obstruction in the surface of the terrain.

FIGURES 10 and 11 show portions of the suspension and elevation hydraulic control system in their schematic relationships.

Figure 1:
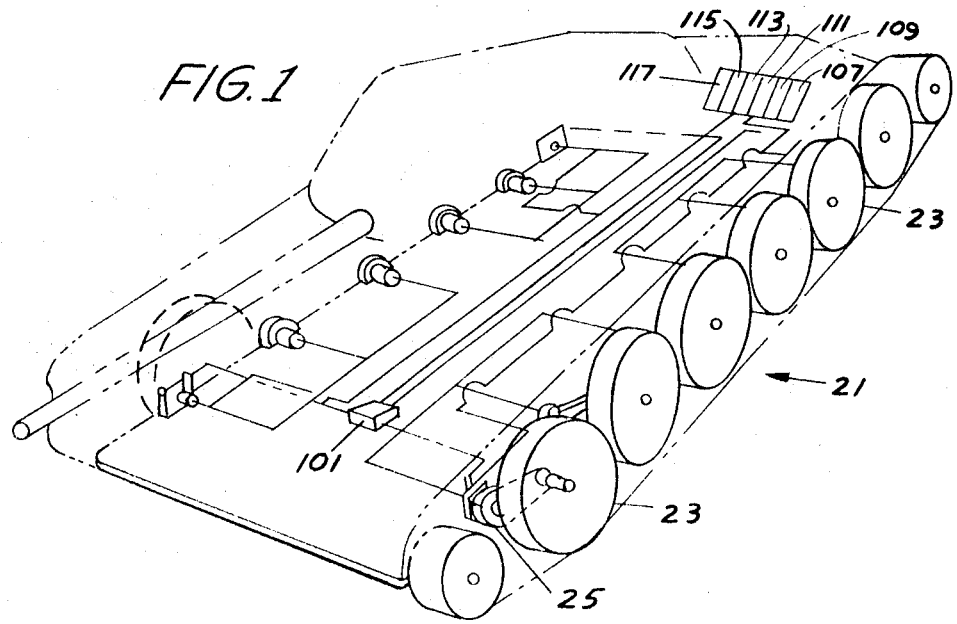
FIGURE 1 shows a phantom perspective view of a vehicle which utilizes the invention with road wheels on a track laying vehicle.
Figure 2:
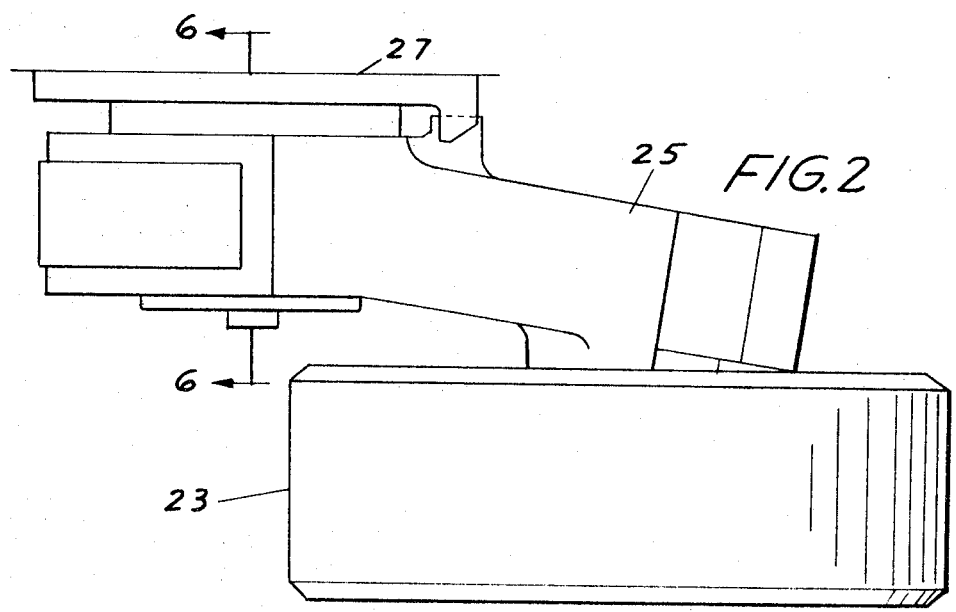
FIGURE 2 shows a top plan view of a vehicle roadarm and road wheel as it is attached to the vehicle body or hull.
Figure 5:
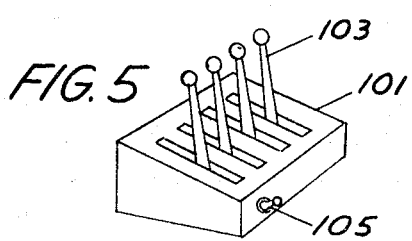
FIGURE 5 shows a perspective view of the remote control means utilized by the vehicle operator.

Referring now to the drawings in more detail, FIGURE 1 shows a vehicle 21 which may be a tank, truck, or other surface vehicle in which it is desired to change the elevation of the body of the vehicle. The vehicle is carried along the surface of the earth by a plurality of road wheels 23. Each road wheel is carried by a roadarm 25 attached to a flange plate 27 which is mounted by means of bolts 28 and is held against a quick disconnect assembly 29 which is on the inside of the vehicle hull 30. Mounted within the roadarms at each corner of the vehicle is an hydraulic valve 31. If desired, a similar valve may be mounted in all of the roadarms, but in many cases it will be necessary only to have the corner roadarms carrying the valves and each valve controlling a plurality of roadarms.

Figure 10:
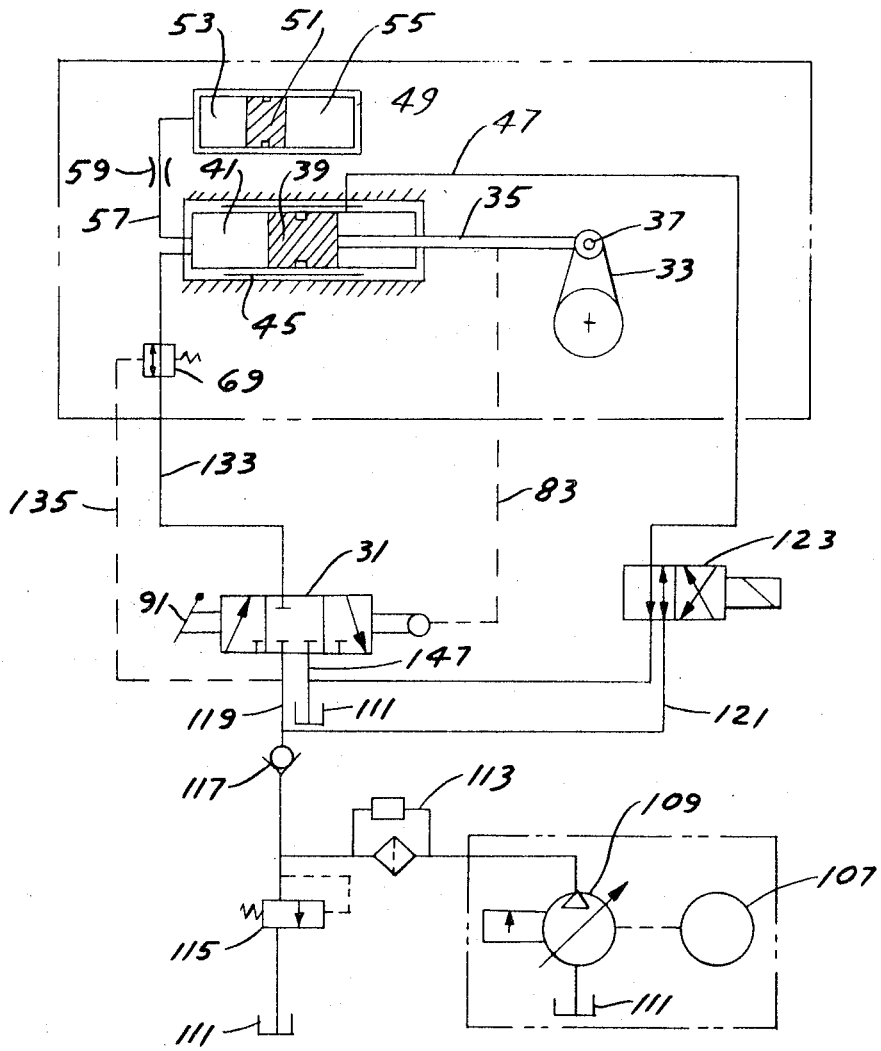

Fixed within each roadarm is a stationary crank 33 to which is attached a piston rod 35 by means of a pin 37. The piston rod 35 carries a piston 39 within a cylinder 41 in the roadarm. Cylinder 41 is comprised of a cylinder liner 43, surrounded by an interference lock-out compartment 45 connected to a fluid passage 47. Also mounted within the roadarm 25 is an accumulator cylinder 49 in which there is a free floating accumulator piston 51. The accumulator piston 51 is acted upon by hydraulic fluid from one side 53 of the accumulator and by a pressurized gas from the other side 55 of the accumulator. As shown in FIGURE 10, an hydraulic line 57 connects cylinder 41 with accumulator 49. The units at the corners of the vehicle, and any others desired, may have damping orifices 59 situated in hydraulic line 57 so as to reduce hull oscillations and provide greater vehicle mobility.

During dynamic operation of the suspension unit, fluid will be forced out of cylinder 41 when the road wheel 23 rises to clear ground irregularities. The fluid will flow through hydraulic line 57 to accumulator 49. As the fluid enters the accumulator it acts upon accumulator piston 51 which in turn compresses the gas in section 55 of the accumulator, thus acting as a spring for the suspension unit.

On those units fitted with damping orifice 59, the orifice will restrict the fluid flow and cause a pressure build-up in the spring loaded cylinder 41. The result will provide a rapid build-up of resisting force or damping effort during high roadarm angular velocities.

An examination of FIGURES 8 and 9 will more fully illustrate the position of the accumulator piston during the spring or damping action of the roadarm. The gas side 55 of accumulator 49 is charged by means of a gas valve 61 and passage 63 leading to the side 55 of the accumulator.

The road wheel 23 is mounted on the roadarm 25 by means of a spindle shaft 65 mounted at position 67 which is at or near the extremity of the roadarm.

As shown in FIGURES 10 and 11 a fail-safe valve 69, which is a normally closed valve, is mounted in the arm to cut off the cylinder and accumulator from the hydraulic system upon loss of hydraulic pressure. The fail-safe valve is held open by the pressure in the hydraulic system.

Now refer to FIGURES 6 and 7 for an illustration of the embodiment of the structure of the valve 31.

The valve is enclosed by a valve body 71 which is integral with the roadarm housing 25 and mounted on flange plate 27. Situated between the flange plate and valve body is a seal 73. The valve body also rotates relative to flange plate 27 and for this purpose is mounted on bearings 75, 77. Stationary crank 33 is also mounted on flange plate 27 and is fixed thereon by means to involute serrations, splines or other suitable means 79; complimentary means are mounted on sleeve 81 of valve plate 27 so that the stationary crank will not rotate. A cap 83 is mounted on the outer extremity of valve body 71 and a cap sleeve 85 etxends into the sleeve 81 of flange plate 27 and is rotatable relative thereto with the valve body 71. A valve spool 87 is mounted within cap sleeve 85 and is rotatable relative to it.

Valve spool 87 is rotated by means of a control linkage 89 which, in turn, actuates a lever 91 on the quick disconnect mechanism 29. Control linkage 89 is operated by a vehicle operator at a convenient position within the vehicle. The vehicle operator has mounted near his position a control box 101 having control levers 103 and an electric switch 105. Movement of control levers 103 actuates the control linkage 89.

Now describing the operation of the hydraulic system more fully, a motor 107 drives a variable pressure compensated pump 109 which pumps oil from reservoir 111 through filter assembly 113. A pressure relief valve 115 is placed in the circuit so as to dump hydraulic fluid to the reservoir upon over-pressurization of the system. After passing through filter 113 the fluid is passed through check valve 117 and pumped into hydraulic input line 119 and also to hydraulic line 121 to lock-out valve 123, which is a solenoid operated valve actuated by electrical switch 105 on control panel 101 through circuitry 125.

Hydraulic fluid passing through input line 119 enters cavity 127 in sleeve 81 of flange plate 27. From cavity 127 hydraulic fluid passes into aperture 129 in cap sleeve 85 of cap 83. Upon rotation of valve spool 87 in a clockwise direction as shown in FIGURE 7, a groove 131 in the valve spool will allow hydraulic connection between aperture 129 and a cylinder hydraulic input line 133 in capsleeve 85. Fluid is also passed through a pressure line 135, FIGURE 10, to hold fail-safe valve 69 in an open position, allowing an hydraulic fluid in cylinder hydraulic input line 133 to enter cylinder 41. In the valve spool position shown in FIGURE 7, a land 137 closes off cylinder hydraulic input line 133 and keeps hydraulic fluid from being passed into or out of the cylinder.

Upon rotation of valve spool 87 in a counter-clockwise direction, as shown in FIGURE 7, radial aperture 139 in valve spool 87 will enter into cooperative relationship with hydraulic input line 133 and allow passage of hydraulic fluid from cylinder hydraulic input line 133 to axial passage 141 in valve spool 87. From axial passage 141 the fluid passes to valve cavity 143 and then into aperture 145 in cap sleeve 85 and then into hydraulic line 147 through which it passes to the reservoir 111.

In order to elevate the vehicle the operator moves levers 103 in a direction such that linkage 89 operates lever 91 so as to rotate valve spool 87 in such a manner that groove 131 connects aperture 129 and cylinder hydraulic input line 133. As the fluid enters cylinder 41, it causes a separation of the piston and the top end of the cylinder. Since the piston rod is mounted and pinned in an off-set or eccentric position, relative to the center of rotation of the roadarm, the separation of the piston and the cylinder top will cause the roadarm to rotate in a downward direction. As roadarm 25 rotates, cap 83 which is fixed thereto will also rotate. As the road arm approaches the desired position, cap sleeve 85 will be rotated so as to contact land 137 on valve spool 87, thereby shutting off the flow of hydraulic fluid to cylinder hydraulic input line 133. When it is desired to depress the vehicle body, the operator actuates levers 103 in the opposite direction thereby causing valve spool 87 to rotate so that radial aperture 139 moves into such a position relative to cylinder hydraulic input line 133 as to allow passage of hydraulic fluid from line 133 into aperture 139, axial passage 141, valve cavity 143, aperture 145, passage 147, and back to reservoir 111. As the vehicle reaches its desired elevation, cap sleeve 85 will again be rotated with roadarm 25 so that hydraulic line 133 is closed by contact with land 137. It can thus be seen that upon slight losses of hydraulic fluid in the roadarm cylinder, the valve 31 will provide an automatic refilling mechanism. Cap sleeve 85 will rotate relative to valve spool 87 upon loss of pressure, thus, automatically bringing about cooperation of groove 131 with aperture 129 and hydraulic line 133.

FIGURES 6 and 10 show the use of the valve 31 with a single roadarm. It should be recalled that one such valve, and its associated systems and structure, may be used in each roadarm or, as shown in FIGURE 11, it may be used in selected roadarms only, with suitable means provided to actuate a series of "slave" roadarms.

When it is desired to lock the roadarms in position, the vehicle operator can actuate switch 105 which opens solenoid operated lock-out valve 113 which allows passage of hydraulic fluid from the pumping system to fluid passage 47 and to lock-out compartment 45, so as to exert a pressure against cylinder liner 43 causing a friction locking of piston 39.

It can thus be seen that applicant has provided a new and very useful suspension and elevation system for vehicles which allows elevation and depression of the vehicle body, locking of the vehicle suspension system—for example, for shooting a cannon or gun—and produces excellent shock absorbing characteristics when the vehicle is in motion.

Without further analysis the foregoing will so fully reveal the gist of the invention that others can, by applying current knowledge, readily adopt it for various applications without omitting features which fairly constitute essential characteristics of the generic and specific aspects of this invention. Therefore such adaptations should, and are intended to be, comprehended within the meaning and range of equivalents of the following claims.

I claim:
1. A vehicle elevation means comprising:
    a roadarm having mounted thereon a road wheel;
    said roadarm containing an hydraulic cylinder;
    a piston restricted from axial movement slidably mounted in said hydraulic cylinder;
    said roadarm being oscillatable within predetermined limits about an axis thereof;
    said piston having mounted therein a piston rod which is fixed within said roadarm at a point eccentric from the axis about which said roadarm oscillates; and
    mounted at the axis about which said roadarm oscillates a valve means being actuatable to allow passage of hydraulic fluid from a reservoir in said vehicle to the hydraulic cylinder in said roadarm.

2. The vehicle elevation means of claim 1 wherein said valve means is further actuatable to allow passage of hydraulic fluid from said hydraulic cylinder to said reservoir.

3. The apparatus of claim 1 wherein said roadarm has mounted thereon a follow-up means whereby when the amount of fluid in said hydraulic cylinder has caused said roadarm to oscillate a desired amount, said follow-up means closes hydraulic passages within said valve to stop the transfer of hydraulic fluid from said reservoir to said hydraulic cylinder.

4. The vehicle elevation means of claim 3 wherein said follow-up means causes cooperation of hydralic passages within said valve so as to add fluid to said hydraulic cylinder upon leakage of hydraulic fluid therefrom.

5. A vehicle elevation and suspension system comprising a roadarm, an hydraulic cylinder mounted in said roadarm, an accumulator cylinder also mounted within said roadarm, and a fluid passage from said hydraulic cylinder to said accumulator, a piston fixed against axial movement within said hydraulic cylinder, and a free floating piston in said accumulator, an hydraulic valve mounted at the axis of oscillation of said roadarm, means within said valve to allow transfer of hydraulic fluid to and from said hydraulic cylinder upon actuation of said valve, means in said roadarm to insert a gas on one side of said free floating piston in said accumulator.

6. The system of claim 5 wherein said hydraulic cylinder may be pressurized about its circumference by an hydraulic means whereby said piston will be held in a fixed position relative to said hydraulic cylinder, thereby holding said roadarm at a predetermined position.

References Cited
UNITED STATES PATENTS

| | | | |
|---|---|---|---|
| 3,395,931 | 8/1968 | Piret | 267—15 X |
| 3,374,005 | 3/1968 | Donlon | 280—124 |
| 3,254,738 | 6/1966 | Larsen | 180—9.2 |

PHILIP GOODMAN, Primary Examiner

U.S. Cl. X.R.
180—9; 267—15